United States Patent
Choi et al.

(10) Patent No.: US 11,691,510 B2
(45) Date of Patent: Jul. 4, 2023

(54) CONTROL APPARATUS AND METHOD USING KNOB

(71) Applicant: HYUNDAI MOBIS Co., Ltd., Seoul (KR)

(72) Inventors: Myung Bin Choi, Seoul (KR); Sung Joon Ahn, Seoul (KR); Seung Hwan Lee, Hwaseong-si (KR); Tae Hun Kim, Seongnam-si (KR)

(73) Assignee: HYUNDAI MOBIS Co., Ltd., Seoul (KR)

( * ) Notice: Subject to any disclaimer, the term of this patent is extended or adjusted under 35 U.S.C. 154(b) by 81 days.

(21) Appl. No.: 17/182,590

(22) Filed: Feb. 23, 2021

(65) Prior Publication Data

US 2021/0261001 A1    Aug. 26, 2021

(30) Foreign Application Priority Data

Feb. 24, 2020  (KR) .......................... 10-2020-0022559

(51) Int. Cl.
*B60K 37/06* (2006.01)

(52) U.S. Cl.
CPC ........ *B60K 37/06* (2013.01); *B60K 2370/126* (2019.05)

(58) Field of Classification Search
CPC ...................................................... B60K 35/00
See application file for complete search history.

(56) References Cited

U.S. PATENT DOCUMENTS

| | | | |
|---|---|---|---|
| 2014/0380243 A1* | 12/2014 | Furue | G06F 3/0362 715/835 |
| 2018/0154774 A1* | 6/2018 | Park | G06F 3/017 |

FOREIGN PATENT DOCUMENTS

KR    10-1173311 B1    8/2012

* cited by examiner

*Primary Examiner* — Nan-Ying Yang
(74) *Attorney, Agent, or Firm* — NSIP Law (57) ABSTRACT

A control apparatus and method using a knob are provided. The control apparatus includes an input unit configured to receive knob operation information, a memory configured to store a program for transmitting a vehicle function control command on the basis of the knob operation information, and a processor configured to execute the program, wherein the processor displays information about the vehicle function control command by using a knob.

16 Claims, 8 Drawing Sheets

CONTROL APPARATUS AND METHOD USING KNOB

CROSS-REFERENCE TO RELATED APPLICATIONS

This application claims priority under 35 U.S.C. § 119 to Korean Patent Application No. 10-2020-0022559, filed on Feb. 24, 2020, the disclosure of which is incorporated herein by reference in its entirety.

TECHNICAL FIELD

The present invention relates to a control apparatus and method using a knob.

BACKGROUND

Vehicle knobs are controllers which are used to set an audio/video/navigation (AVN) volume, change a frequency, search for tracks/channels/files, and control a temperature and an air volume of an air conditioner.

In the related art, a pre-set function may be manipulated by using a knob, but there is a problem where it is difficult to execute a function of satisfying various needs of passengers.

SUMMARY

Accordingly, the present invention provides a control apparatus and method using a knob, which execute a suitable function on the basis of needs of passengers, in consideration of rotating the knob and changing a position of the knob.

In one general aspect, a control apparatus using a knob includes an input unit configured to receive knob operation information, a memory configured to store a program for transmitting a vehicle function control command on the basis of the knob operation information, and a processor configured to execute the program, wherein the processor displays information about the vehicle function control command by using a knob.

In another general aspect, a control method using a knob includes step (a) of checking at least one of operation state information and position information about the knob and step (b) of controlling display by the knob.

In another general aspect, a control system using a knob includes a knob configured to receive and transfer operation information and a controller configured to control a screen displayed on the knob on the basis of the operation information and to execute a vehicle function.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter.

The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
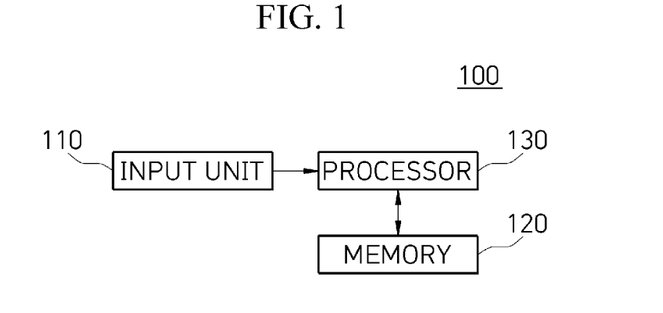
FIG. 1 illustrates a control apparatus using a knob, according to an embodiment of the present invention.

FIG. 1 illustrates a control apparatus using a knob, according to an embodiment of the present invention.

The control apparatus using a knob according to an embodiment of the present invention may include an input unit 110 which receives knob operation information, a memory 120 which stores a program for transmitting a vehicle function control command on the basis of the knob operation information, and a processor 130 which executes the program. The processor 130 may display information about the vehicle function control command on the knob.

The processor 130 may move a lens disposed in the knob on the basis of the knob operation information to enlarge or reduce a displayed image.

The processor 130 may display a function menu on the knob on the basis of the knob operation information.

Position information about the knob may be position information about a position in a certain display region. The input unit 110 may receive the position information about the knob, and the processor 130 may display a predetermined function menu on the knob on the basis of the position information about the knob.

The processor 130 may check an access control level corresponding to a vehicle function on basis of the position information about the knob to display information about the vehicle function control command by using the knob.

Figure 2:
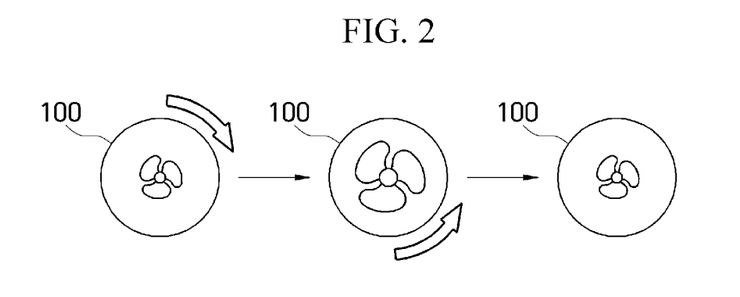
FIG. 2 illustrates a display aspect (function manipulation) based on a knob rotation of a control apparatus using a knob, according to an embodiment of the present invention.

FIG. 2 illustrates a display aspect (function manipulation) based on a knob rotation of a control apparatus using a knob, according to an embodiment of the present invention.

Referring to FIG. 2, a state where a user adjusts an air volume of an air conditioner by using a knob 100 is illustrated.

As the user rotates the knob 100 clockwise or counterclockwise, a convex lens of the knob 100 may move forward and rearward and an image (an air volume image) may be enlarged or reduced, and thus, an air volume function may be adjusted based thereon.

As the user rotates the knob 100 clockwise, an air volume may increase, and an air volume image may be enlarged.

As the user rotates the knob 100 counterclockwise, the air volume may decrease, and the air volume image may be reduced.

As illustrated in FIG. 2, an image may be enlarged/reduced, and thus, a level of an air volume may be additionally displayed as a separate number (for example, 1 to 5).

In addition to the illustration of FIG. 2, as a user rotates a knob clockwise, a sound volume of an audio may increase, and a sound volume image may be enlarged. Also, as the user rotates the knob counterclockwise, the sound volume of the audio may decrease, and the sound volume image may be reduced.

The knob 100 may be disposed in a display region or under the display region, and thus, when the knob 100 moves to a predetermined position, a function menu (an air volume of an air conditioner, a sound volume of an audio, etc.) corresponding thereto may be displayed. For example, when it is assumed that a display region is divided into an air conditioner control region and an audio control region, as the user moves the knob 100 to the air conditioner control region, an air volume image may be displayed and an air volume may be adjusted based on an operating state of the knob 100, and as the user moves the knob 100 to the audio control region, a sound volume image may be displayed and a sound volume may be adjusted based on the operating state of the knob 100.

Moreover, the knob 100 may display a function menu on the basis of a sound command of a driver. For example, when a driver utters "driver seat air volume", the knob 100 may display a current driver seat air volume as illustrated in FIG. 2 and may control an air volume function on the basis of an operating state of the knob 100 (a clockwise rotation or a counterclockwise rotation described above).

Figure 3:
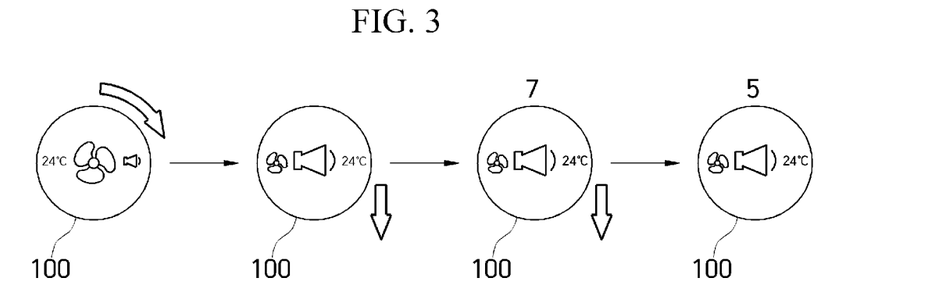
FIG. 3 illustrates a display aspect (change a function menu) based on a knob rotation, according to an embodiment of the present invention.

FIG. 3 illustrates a display aspect (change a function menu) based on a knob rotation, according to an embodiment of the present invention.

In a convex lens configuring a knob 100, it is shown that an image size at a center differs from an image size at an edge.

As the knob 100 rotates, function menus (a temperature setting, an air volume, and a sound volume) may be sequentially displayed, and in this case, information about a function menu placed at the center may be relatively largely displayed and information about function menus placed at both sides may be relatively small displayed (preview).

Referring to FIG. 3, in a state where a temperature setting function menu, an air volume function menu, and an air volume function menu are sequentially displayed, a user may rotate the knob 100 clockwise to allow a sound volume function to be displayed at the center.

The user may adjust a sound volume which is a function menu currently displayed at the center, based on the vertical manipulation of the knob 100.

The user may downward press the knob 100 to input a control command for decreasing a sound volume.

A sound volume image displayed at the center of the knob 100, as illustrated in FIG. 2, may decrease in sound volume on the basis of a knob operating state and may be displayed as a relatively small image, or a level of the sound volume may be displayed as a number (7->5).

Although not shown in FIG. 3, when the user rotates the knob 100 in a rotation direction after a sound volume level is adjusted, the temperature setting function menu may be displayed at the center of the knob 100, and as described above, the user may upward and downward manipulate the knob 100 to increase/decrease a set temperature.

Figure 4:
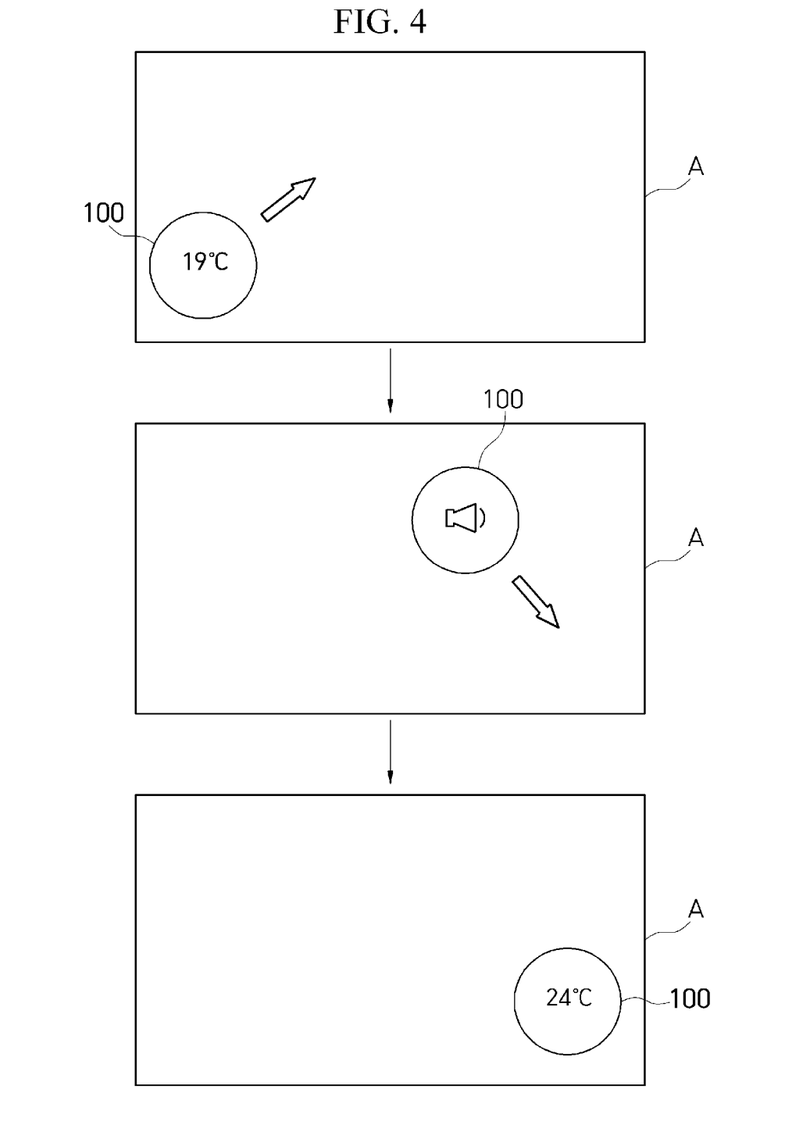
FIGS. 4 to 6 illustrate function execution based on knob movement, according to an embodiment of the present invention.
Figure 5:
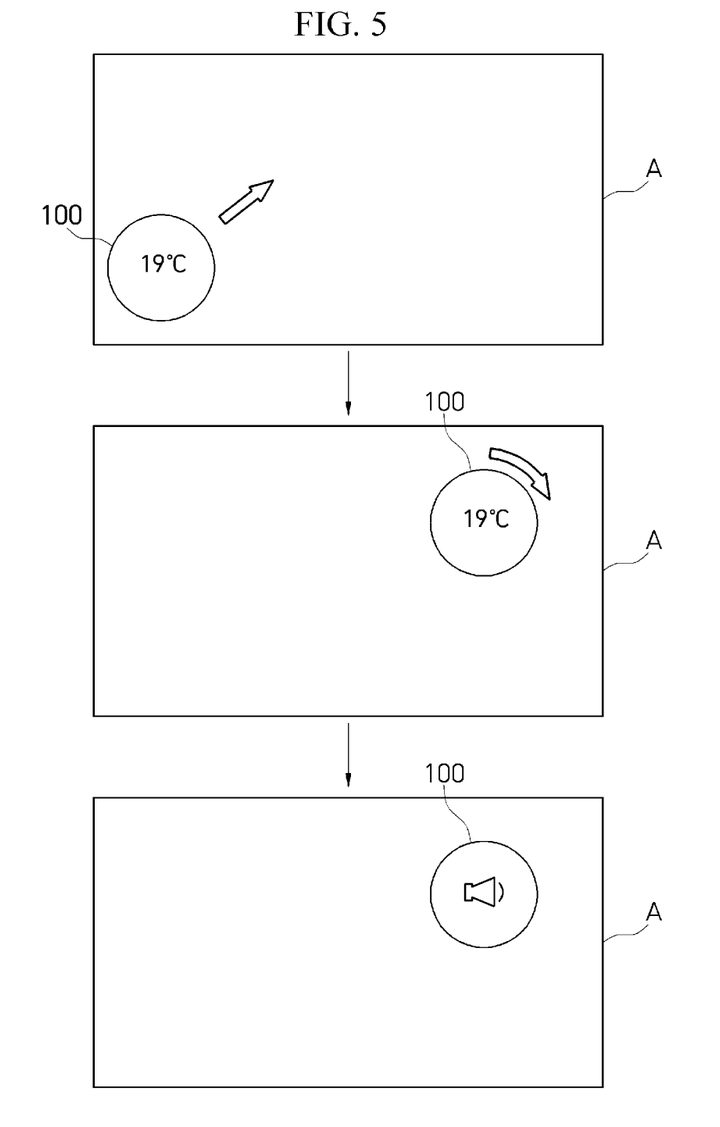
Figure 6:
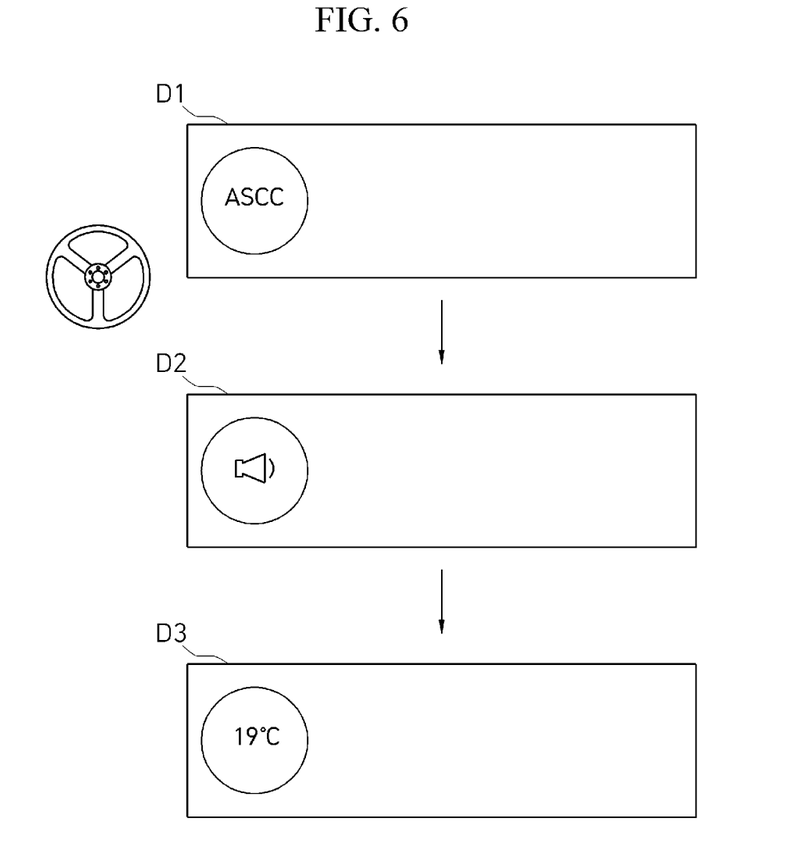

FIGS. 4 to 6 illustrate function execution based on knob movement, according to an embodiment of the present invention.

Referring to FIG. 4, as the knob 100 moves in a display region A, a function menu manipulated through the knob 100 may be differently set, and thus, a function based on a region may be set by using one knob 100.

Referring to FIG. 4, in a case where the knob 100 is placed at a left side of the display region A, a temperature adjusting function of an air conditioner disposed at a driver side may be displayed on the knob 100. In a case where the knob 100 is placed at a center of the display region A, a function of adjusting an audio volume may be displayed on the knob 100. In a case where the knob 100 is placed at a right side of the display region A, a temperature adjusting function of an air conditioner disposed at a passenger seat side may be displayed on the knob 100.

In this case, based on a position of the knob 100, an intention of a driver for controlling a function may be checked, and a control region suitable for the intention may be guided.

For example, it may be assumed that a position of the knob 100 moves from a left portion of the display region A to a center of the display region A.

In this case, it may be checked that the user desires to move a position of the knob 100 to an air conditioner temperature adjustment function (the center of the display region A), and a separate guideline line corresponding to a center region may be displayed, thereby performing a guide for allowing the knob 100 to be placed in the center region.

Referring to FIG. 5, when the knob 100 is placed at a left side of the display region A, a function of adjusting a temperature of an air conditioner placed at a driver side may be displayed on the knob 100, and as the knob 100 moves to a center of the display region A, the air conditioner temperature adjustment function may be continuously displayed on the knob 100. Subsequently, as the knob 100 rotates clockwise, a function of adjusting an audio volume may be displayed on the knob 100.

That is, a driver and a passenger on a passenger seat may move the knob 100 in the display region A to control various functions through the knob 100.

Referring to FIG. 6, in a case where two or more displays are disposed in a vehicle, a function suitable for each of the displays may be manipulated by using one knob.

In this case, based on a position of the knob or an in-display contact region of the knob, content and an access control level may be differently applied, and manipulation of a function based thereon may be performed.

A knob in a display D1 at a driver seat position may have an access control level for vehicle control (an ASCC-inter-vehicle interval, a drive mode, and an ADAS function setting), control a vehicle function, and perform control which is not limited in infortainment (volume, air control, etc.).

A knob in a display D2 at a passenger seat position may have an access control level for infortainment control other than vehicle control and may perform control which is not limited in infortainment.

A knob in a display D3 at a rear seat position may perform control on only a backward speed dedicated function (for example, control a rear seat air conditioner by using a knob).

In controlling a function by using a knob in a display at a rear seat position, when a vehicle function of another passenger region is affected thereby, final function control may be performed based on all influences. For example, in a case which controls a sound volume of rear seat display content by using a knob, it may be assumed that obstruction occurs in a navigation guide of driver seat AVN as a sound volume increases. A driver may adjust a sound volume corresponding to content of a rear seat display by using a sound, a gesture, a button input, an AVN touch input, etc., and based thereon, a display at a rear seat position may readjust a sound volume.

A position of a knob may accurately check position information on the basis of ultra wide band (UWB) communication between an in-vehicle anchor and an UWB tag.

A function executable by a knob may be displayed based on current position information about a knob obtained through the UWB communication.

Figure 7:
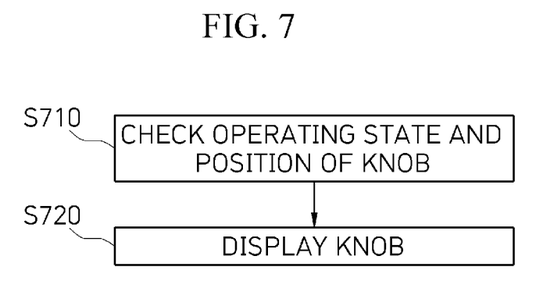
FIG. 7 illustrates a control method using a knob, according to an embodiment of the present invention.

FIG. 7 illustrates a control method using a knob, according to an embodiment of the present invention.

The control method using a knob according to an embodiment of the present invention may include step S710 of checking at least one of operation state information and position information about a knob and step S720 of controlling a display of the knob.

In step S720, a function image or a function menu may be displayed on the knob on the basis of the operation state information about the knob which is checked in step S710.

For example, when a function image displayed on the knob is an air volume image, as illustrated in FIG. 2, based on an operating state where the knob rotates clockwise or counterclockwise, the air volume image may be enlarged or reduced and an air volume may be adjusted.

At this time, a convex lens configuring the knob move based on the operating state of the knob, and thus, the function image may be enlarged or reduced.

The convex lens configuring the knob may allow image sizes at a center and an edge to be differently seen, and thus, a function menu (for example, a temperature setting, an air volume, and a sound volume as illustrated in FIG. 3) may be displayed and a function menu placed at the center may be displayed to be relatively greater than function menus placed at both sides.

As illustrated in FIG. 3, a function menu to control may be selected according to rotating the knob clockwise or counterclockwise, and a function of a corresponding function menu (for example, sound volume adjustment in FIG. 3) may be controlled according to pressing the knob in a vertical direction.

In step S720, a pre-set function menu may be displayed on the knob on the basis of the position information about the knob which is checked in step S710.

In step S720, an access control level based on the position information about the knob may be checked, and a function menu may be set.

As illustrated in FIG. 4, an access control level for controlling a vehicle function may be checked based on knob position information about a position in a display region. As illustrated in FIG. 4, in a case where the knob is placed at a left side of the display region A, a temperature adjusting function of an air conditioner disposed at a driver side may be displayed on the knob. In a case where the knob 100 is placed at a center of the display region A, a function of adjusting an audio volume may be displayed on the knob. In a case where the knob is placed at a right side of the display region A, a temperature adjusting function of an air conditioner disposed at a passenger seat side may be displayed on the knob.

As illustrated in FIG. 6, a region, where a knob is placed, of a plurality of displays may be checked, and an access control level for controlling a vehicle function may be checked. As illustrated in FIG. 6, a knob in a display D1 at a driver seat position may have an access control level for vehicle control (an ASCC-inter-vehicle interval, a drive mode, and an ADAS function setting), control a vehicle function, and perform control which is not limited in infortainment (volume, air control, etc.). A knob in a display D2 at a passenger seat position may have an access control level for infortainment control other than vehicle control and may perform control which is not limited in infortainment. A knob in a display D3 at a rear seat position may perform control on only a backward speed dedicated function (for example, control a rear seat air conditioner by using a knob).

Figure 8:
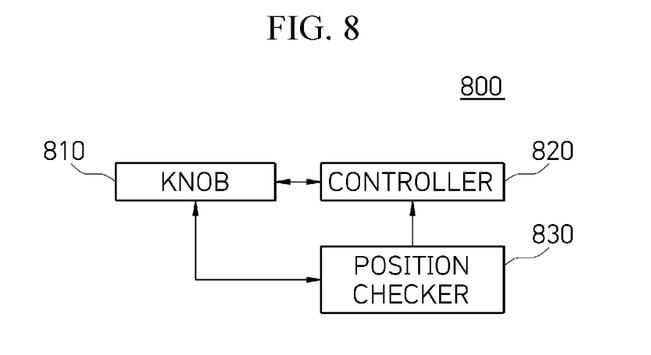
FIG. 8 illustrates a control system using a knob, according to an embodiment of the present invention.

FIG. 8 illustrates a control system using a knob, according to an embodiment of the present invention.

The control system using a knob according to an embodiment of the present invention may include a knob 810 which receives and transfers operation information and a controller 820 which controls a screen displayed on the knob 810 and executes a vehicle function, based on the operation information.

The controller 820 may control a position of a lens disposed in the knob 810 to adjust a size of an image displayed on the knob 810.

The control system using a knob according to an embodiment of the present invention may further include a position checker 830 which checks position information about the knob 810 and transfers the checked position information to the controller 820, and the position checker 830 may check the position information about the knob 810 through UWB communication.

The controller 820 may control a screen displayed on the knob 810 on the basis of an access control level based on the position information.

The control method using a knob according to the embodiments of the present invention may be implemented in a computer system, or may be stored in a recording medium. The computer system may include at least one processor and memory, a user input device, a data communication bus, a user output device, and a storage. Each of the elements described above may perform data communication through the data communication bus.

The computer system may further include a network interface coupled to a network. The processor may be central processing unit (CPU), or may be a semiconductor device which processes instructions stored in the memory and/or the storage.

The memory and the storage may each include various types of volatile or non-volatile storage mediums. For example, the memory may include read-only memory (ROM) and random access memory (RAM).

Therefore, the control method using a knob according to the embodiments of the present invention may be implemented by using a method executable by a computer. In a case where the control method using a knob according to the embodiments of the present invention is performed by a computer device, computer-readable instructions may perform the control method according to the embodiments of the present invention.

The control method using a knob according to the embodiments of the present invention may be implemented as a computer-readable code in a computer-readable recording medium. The computer-readable recording medium may include all kinds of recording mediums which store data readable by a computer system. For example, the computer-readable recording medium may include ROM, RAM, magnetic tape, magnetic disk, flash memory, optical data storage device, etc. Also, the computer-readable recording medium may be stored and executed as a code which is distributed to a computer system connected to a computer communication network and is readable by using a distributed scheme.

According to the embodiments of the present invention, by using a minimum number of knobs, a suitable vehicle function may be controlled based on the movement of a position of a knob, and thus, the number of buttons may decrease.

Moreover, a position of a knob may move based on a position of a passenger, and a vehicle function may be controlled based on an access control level.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. A control apparatus using at least one knob, the control apparatus comprising:
a knob configured to receive knob operation information;
a memory configured to store a program for transmitting a vehicle function control command based on the knob operation information; and
a processor configured to execute the program, wherein the processor is further configured to:
display a function image on the knob based on the knob operation information; and
adjust a size of the displayed function image in response to the knob being rotated clockwise or counterclockwise by a user to adjust a vehicle function corresponding to the displayed function image;
move a convex lens disposed in the knob to enlarge or reduce the displayed function image, based on the knob operation information, wherein the convex lens provides a first sized image at a center portion thereof and a second size image at an edge portion thereof; and
modify the displayed function image to provide a respective first image as the first sized image at the center portion and a respective second image as the second size image at the edge portion depending on the knob operation information according to a rotation of the knob.

2. The control apparatus of claim 1, wherein the processor is configured to display a function menu on the knob based on the knob operation information.

3. The control apparatus of claim 1, wherein the knob is configured to receive position information about the knob, and
wherein the processor is configured to display a predetermined function menu on the knob based on the position information about the knob.

4. The control apparatus of claim 3, wherein the position information about the knob is position information about a position in a certain display region.

5. The control apparatus of claim 3, wherein the processor is configured to check an access control level corresponding to a vehicle function based on the position information about the knob to display the information about the vehicle function control command by using the knob.

6. A control method using a knob, the control method comprising:
checking at least one of operation state information and position information about the knob; and
controlling a display of the knob, wherein the controlling of the display of the knob comprises:
displaying a function image on the knob based on the operation state information about the knob;
adjusting a size of the displayed function image in response to the knob being rotated clockwise or counterclockwise by a user to adjust a vehicle function corresponding to the displayed function image;
moving a convex lens disposed in the knob to enlarge or reduce the displayed function image, based on the one of operation state information and position information, wherein the convex lens provides a first sized image at a center portion thereof and a second size image at an edge portion thereof; and
modifying the displayed function image to provide a respective first image as the first sized image at the center portion and a respective second image as the second size image at the edge portion depending on the one of operation state information and position information according to a rotation of the knob.

7. The control method of claim 6, wherein the vehicle function comprises at least one of an air volume, a sound volume, and a temperature setting.

8. The control method of claim 6, wherein the controlling of the display of the knob comprises:
displaying a predetermined function menu on the knob based on the position information about the knob.

9. The control method of claim 8, wherein the controlling of the display of the knob comprises:
checking an access control level based on the position information about the knob to set the predetermined function menu.

10. A control system using at least one knob, the control system comprising:
a knob configured to receive and transfer operation information; and
a controller configured to control a display of the knob based on the operation information to control a vehicle function,
wherein the controller is further configured to:
display a function image on the knob based on the operation information; and
enlarge or reduce the displayed function image in response to the knob being rotated clockwise or counterclockwise by a user to adjust a vehicle function corresponding to the displayed function image;
move a convex lens disposed in the knob to enlarge or reduce the displayed function image, based on the operation information, wherein the convex lens provides a first sized image at a center portion thereof and a second size image at an edge portion thereof; and
modify the displayed function image to provide a respective first image as the first sized image at the center portion and a respective second image as the second size image at the edge portion depending on the operation information according to a rotation of the knob.

11. The control system of claim 10, wherein the controller is configured to control a position of the convex lens disposed in the knob to adjust a size of the function image displayed on the knob, and
wherein the vehicle function comprises at least one of an air volume, a sound volume, and a temperature setting.

12. The control system of claim 10, further comprising a position checker configured to check position information about the knob to transfer the checked position information to the controller.

13. The control system of claim 12, wherein the position checker checks the position information about the knob through ultra wide band communication.

14. The control system of claim 12, wherein the controller controls the display of the knob based on an access control level based on the position information.

15. The control apparatus of claim 1, wherein the vehicle function comprises at least one of an air volume, a sound volume, and a temperature setting.

16. The control apparatus of claim 1, wherein the knob is configured to be moveably provided on a display region, and
wherein the processor is configured to display one of a plurality of predetermined function menus on the knob as the displayed function image based on a predetermined function associated with position information of the knob on the display region.

* * * * *